(12) United States Patent
Mendis

(10) Patent No.: US 6,581,966 B2
(45) Date of Patent: Jun. 24, 2003

(54) TWIN AXIS STEERING WHEEL SYSTEM

(75) Inventor: Kolita Mendis, Newbury Park, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/755,876

(22) Filed: Jan. 5, 2001

(65) Prior Publication Data

US 2002/0089160 A1 Jul. 11, 2002

(51) Int. Cl.$^7$ ................................................. B62D 1/18
(52) U.S. Cl. ........................ 280/777; 280/775; 180/274
(58) Field of Search ................................ 180/274, 280, 180/402; 74/492, 493; 280/775, 777; 701/49

(56) References Cited

U.S. PATENT DOCUMENTS

| | | | | | |
|---|---|---|---|---|---|
| 3,811,337 | A | * | 5/1974 | Allison | 74/492 |
| 4,022,495 | A | | 5/1977 | Pizzocri | |
| 4,968,058 | A | * | 11/1990 | Jones | 280/777 |
| 4,984,646 | A | * | 1/1991 | Sano et al. | 180/402 |
| 5,295,712 | A | * | 3/1994 | Omura | 280/731 |
| 5,320,384 | A | * | 6/1994 | Arnold et al. | 280/777 |
| 5,503,431 | A | | 4/1996 | Yamamoto | |
| 5,517,877 | A | * | 5/1996 | Hancock | 188/371 |
| 5,562,306 | A | * | 10/1996 | Rispeter | 280/775 |
| 5,802,496 | A | * | 9/1998 | Cymbal | 188/374 |
| 6,078,854 | A | * | 6/2000 | Breed et al. | 180/273 |
| 6,116,648 | A | * | 9/2000 | Holly et al. | 280/777 |
| 6,227,571 | B1 | * | 5/2001 | Sheng et al. | 280/731 |
| 6,234,528 | B1 | * | 5/2001 | Ben-Rhouma et al. | 280/777 |
| 6,241,284 | B1 | * | 6/2001 | De Verdier et al. | 280/777 |
| 6,290,258 | B1 | * | 9/2001 | Parkinson et al. | 280/775 |
| 6,305,711 | B1 | * | 10/2001 | Steffens et al. | 280/731 |

FOREIGN PATENT DOCUMENTS

| | | | |
|---|---|---|---|
| DE | 37 23 376 A1 | * | 1/1989 |
| DE | 40 30 841 A1 | * | 4/1992 |
| DE | 198 50 755 A1 | * | 5/2000 |
| EP | 0479 455 A2 | * | 4/1992 |
| EP | 0 582 107 A1 | * | 2/1994 |
| EP | 0 849 141 A1 | * | 6/1998 |
| GB | 2 350 328 A | * | 11/2000 |
| WO | WO 96/16841 | * | 6/1996 |
| WO | WO 98/22325 | * | 5/1998 |
| WO | WO 00/76832 A1 | * | 12/2000 |

* cited by examiner

Primary Examiner—Paul N. Dickson
Assistant Examiner—Ruth Ilan
(74) Attorney, Agent, or Firm—Artz & Artz, P.C.

(57) ABSTRACT

A steering wheel system (10) for a steer-by-wire vehicle includes a lower subframe (52), an upper subframe (54), and a steering wheel (20). The lower subframe (52) is attached to the vehicle body (36) and moveable with respect to the vehicle body (36) by a translational sliding mechanism (38). The upper subframe (54) is attached to said lower subframe (52) through a translational sliding mechanism (34) to allow movement of the upper subframe (54) with respect to the lower subframe (52) upon application of a predetermined amount of force.

17 Claims, 2 Drawing Sheets

TWIN AXIS STEERING WHEEL SYSTEM

TECHNICAL FIELD

The present invention relates generally to an adjustable twin axis steering column system for a vehicle, and more particularly to an adjustable twin axis steering wheel system for a vehicle that provides optimum safety for a driver in the event of a head-on collision.

BACKGROUND OF THE INVENTION

It is known that injuries can occur in a head-on collision due to a so-called secondary collision of a vehicle occupant with a vehicle steering wheel. In order to prevent such a so-called secondary collision, a variety of steering column arrangements have been proposed and put into practical use. Such arrangements include a steering column structure, including a steering shaft, which contracted to absorb impact energy when a vehicle occupant collides against the steering wheel. This arrangement also included an airbag located inside a steering wheel, which was adapted to inflate so that the vehicle occupant would strike the inflated airbag, thereby absorbing any impact energy of the vehicle occupant if a head-on collision of the automotive vehicle occurs.

As is known, during a vehicle collision, it is usual that a driver seated on a driver's seat will travel generally horizontally toward the front section of a vehicle body. It is also usual that the steering column is disposed such that it extends obliquely upwardly in a manner to incline relative to a front panel defining a passenger compartment.

The steering column, thus, extends along an axis that obliquely crosses the breast section of a driver. When a driver is thrown toward the vehicle body front section in a vehicle collision, the driver impacts the steering wheel and/or the airbag attached to the steering wheel. Accordingly, this secondary impact generates a component force in the axial direction of the steering column that contracts the column, and another perpendicular component force that attempts to push the steering wheel upwards perpendicular to the steering column. In view of the above, a structure for absorbing and attenuating the axial component force of the steering column in the secondary collision has been proposed and disclosed, for example, in Japanese utility model provisional publication nos. 60-81069 and 62-155067 in which a bellows type or resilient energy-absorbing body is interposed between the steering column and a front panel or dashboard.

However, drawbacks have been encountered in the above-discussed conventional steering systems, in which a space between the steering column and the front panel or the like is small, and therefore a sufficient stroke to absorb the horizontal component force at the secondary collision cannot be obtained even if the energy absorbing body is interposed in the space. Thus, in the conventional steering systems, an effective energy absorbing structure cannot be provided to protect a vehicle occupant upon the secondary collision.

A further attempt to solve the problem of the so-called secondary collision is disclosed in U.S. Pat. No. 5,503,431. The '431 patent discloses a steering system having an upper shaft and a lower shaft. The lower shaft is axially movably connected to the upper shaft and includes a first section connected to the upper shaft, and a second section. The steering column has an upper bracket connected thereto. An energy-absorbing member is provided in a manner that the upper bracket is connected through the energy-absorbing member to a vehicle body to be generally horizontally movable relative thereto. A first universal joint is disposed between the first and second sections of the lower shaft. A bearing bracket is rotatably supported to the vehicle body and rotatably supports the second section of the lower shaft.

During a secondary collision where a vehicle occupant collides with a steering wheel, the impact load of the vehicle occupant is input to a column jacket through a steering wheel and the upper shaft. The impact force input to the column jacket is absorbed by the energy-absorbing member while the column jacket and the upper bracket horizontally move toward the front section of the vehicle body. Upon such a horizontal movement of the column jacket, the lower shaft horizontally moves thereby bending the first universal joint located at the upper side of the bearing bracket and allowing the bearing bracket to rotate. The system disclosed in the '431 patent is extremely complicated, requires a multitude of parts, and is, thus, expensive to manufacture. The portion of the steering column that translates upon impact by the occupant's torso includes the entire mass of the column jacket and the upper bracket. Reduction of the mass of the portion that translates forward reduces the potentially injurious impact force on the occupant's torso.

SUMMARY OF THE INVENTION

It is an object of the present invention to provide an adjustable twin axis steering wheel system for a vehicle that provides optimum safety characteristics for a wide range of drivers having varying physical characteristics.

It is a further object of the present invention to provide an adjustable twin axis steering wheel system for use in a vehicle that utilizes a conventional steering shaft or steer-by-wire technology.

It is still another object of the present invention to provide a twin axis steering wheel system that orients the steering wheel to a favorable position in the event of a secondary collision.

It is still another object of the present invention to minimize the mass of the portion of the steering column that is translated forward in order to reduce the magnitude of potentially injurious force of impact upon the occupant's torso.

In accordance with the above and the other objects of the present invention, an automatically adjustable twin axis steering wheel system is provided. The steering wheel system is part of a steer-by-wire steering system that allows the vehicle to be steered electronically. The steering wheel system includes a steering wheel pivotally attached to an upper subframe. The upper subframe is secured to a lower subframe, which is attached to the vehicle body structure by a translational joint. The translational joint allows the steering wheel system to be automatically adjusted to compensate for a driver's stature. The upper subframe is moveable horizontally with respect to the lower subframe in the event of a driver exerting a sufficient force on the steering wheel.

These and other features of the present invention will become apparent from the following description of the invention when viewed in accordance with the accompanying drawings and appended claims.

DETAILED DESCRIPTION OF THE PREFERRED EMBODIMENT(S)

Figure 1:
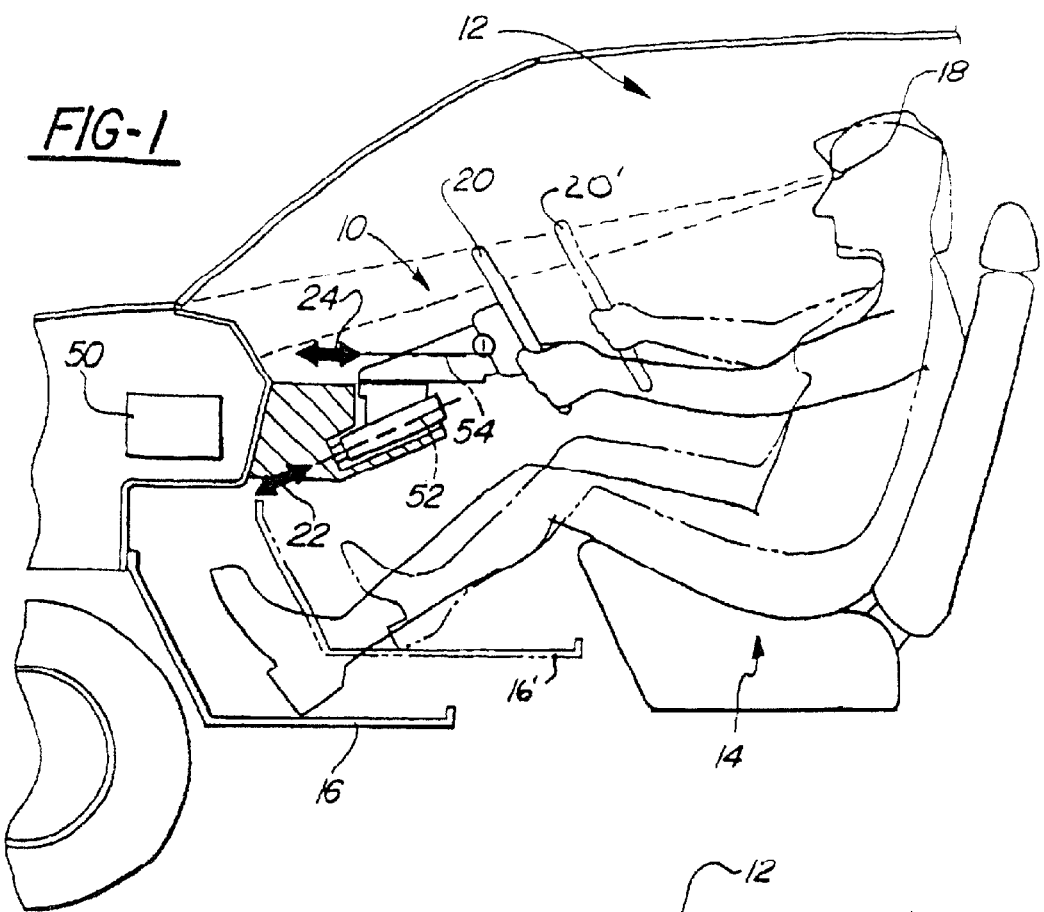
FIG. 1 is a schematic illustration of a driver compartment of a vehicle illustrating an adjustable twin axis steering wheel system in a retracted position in accordance with a preferred embodiment of a present invention.

Referring now to FIG. 1, a twin axis steering column system 10 in accordance with the present invention is disclosed. The steering column system 10 is preferably incorporated into a fixed eye point seating system 12 including a vehicle seat 14 and an adjustable pedal system 16 that allow the steering wheel system 10, the vehicle seat 14, and the pedal system 16 to be automatically adjusted to accommodate various drivers having a wide range of statures. The adjustment is based on a determination of an optimum position of a physical feature of a driver, such as the eyes. The eyes or other physical feature are then positioned in the optimum location, which is generally indicated by reference number 18, by moving the vehicle seat 14. Thereafter, the steering wheel system 10 and the pedal system 16 can be adjusted. The adjustments are effectuated by a computer 50. The fixed eye point seating system 12 is described in detail in pending U.S. Pat. No. 6,450,530, filed Oct. 17, 2000, and entitled "Seating System With Optimum Visibility." Such application is hereby incorporated by reference as though set forth fully herein.

The twin axis steering wheel system 10 allows the position of the steering wheel 20 to be moved between a range of positions. A first position is shown in solid lines in FIG. 1 for a driver of larger stature. A second position is shown in FIG. 1 in phantom lines for a driver of smaller stature, as generally indicated by reference number 20'. The preferred steering wheel system 10 can be adjusted over 280 millimeters in a diagonal direction, as generally indicated by the arrow 22, along an axis generally indicated by reference number 52. This amount of adjustment is several times greater than that offered by conventional steering columns.

The steering wheel 20 can also be retracted in a horizontal direction, as generally indicated by the horizontal arrow 24, along an axis generally indicated by reference number 54. The preferred steering wheel system 10 can be moved rearward by over 200 millimeters during a frontal crash, creating a large deceleration space ahead of a driver, similar to that available on the passenger side. The preferred twin axis steering wheel system 10 is utilized in a steer-by-wire steering system where rotation of the steering wheel 20 is sensed and transferred to the computer 50, or a separate computer, which is in electrical communication with the vehicle wheels to effectuate their turning. The electric steering system facilitates steering wheel system movement without interference from a steering shaft and also allows a simple gearless non-rotating hub mounting for the driver's side airbag. This is because there is no steering column or shaft, which is necessary when a mechanical connection translation rotation of the steering wheel to turning of the wheels.

Figure 2:
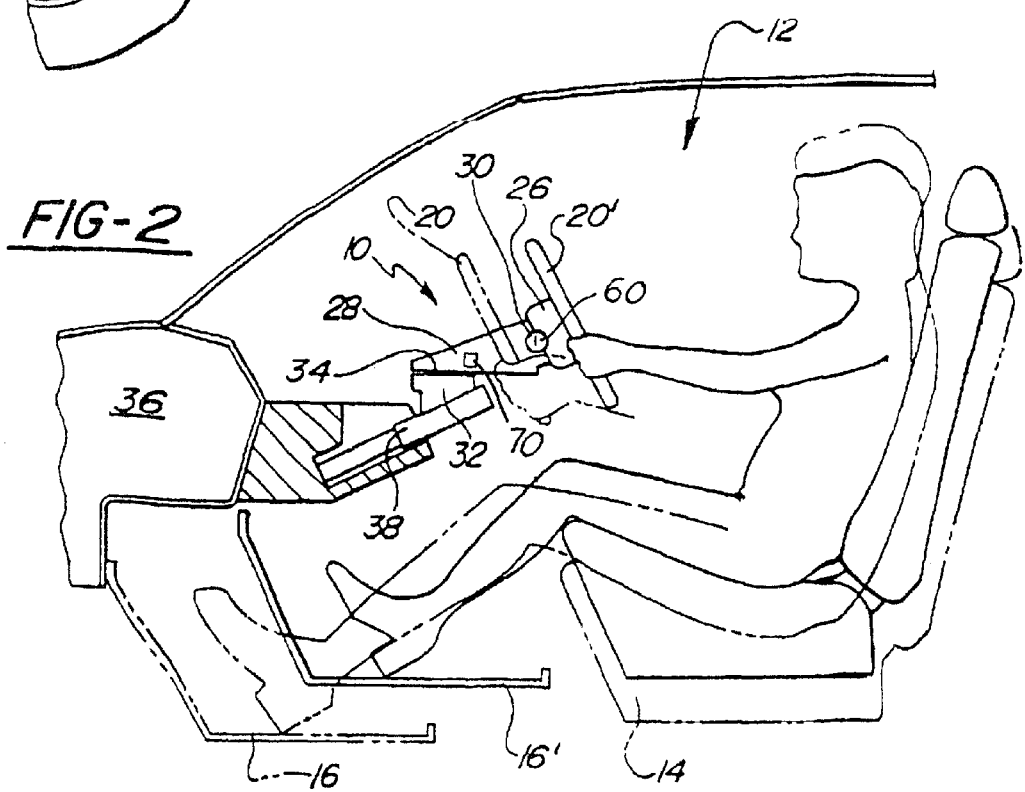
FIG. 2 is a schematic illustration of the driver compartment of a vehicle illustrating an adjustable twin axis steering wheel system in an extended position in accordance with a preferred embodiment of the present invention.
Figure 4:
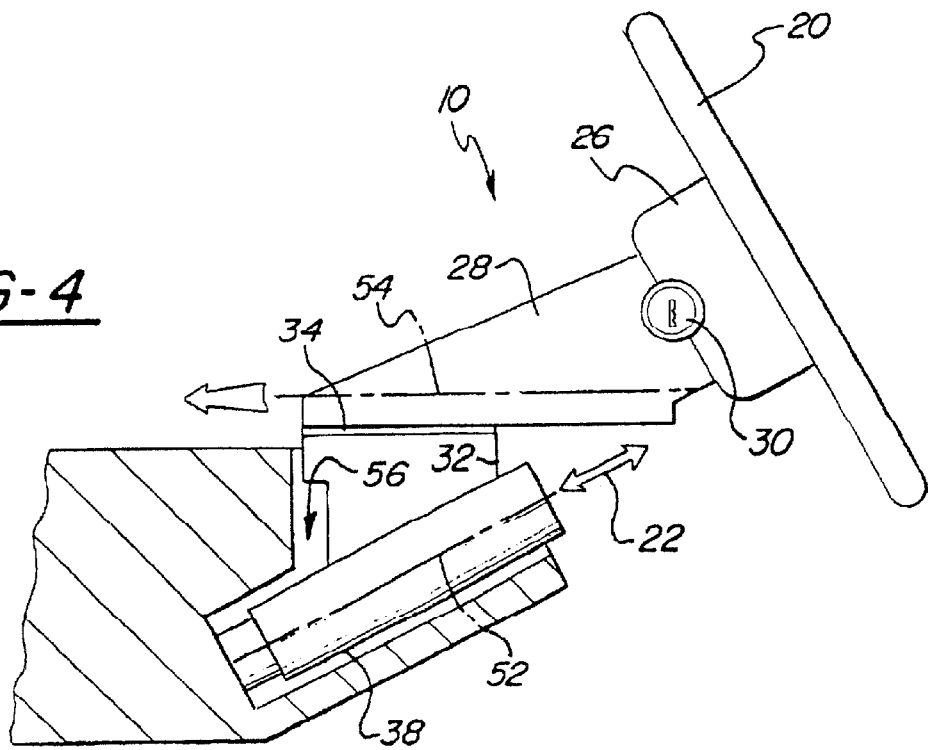
FIG. 4 is a side view illustrating the movement of a twin axis steering wheel system in accordance with a preferred embodiment of the present invention.

Turning now to FIGS. 2 and 4, the steering wheel 20 is attached to a steering wheel hub 26, which contains a wheel bearing, a position sensor, and other mechanisms necessary to provide the steering feedback and sensory input to the driver via the steering wheel 20. The steering wheel hub 26 is connected to an upper subframe 28 by a revolute joint 30. The revolute joint 30 allows the angle of the steering wheel 20 to be adjusted and then secured in place by a suitable locking mechanism. The upper subframe 28 is attached to a lower subframe 32 through a translational sliding mechanism 34, which allows relative movement of the upper subframe 28 in the direction of travel of the vehicle, with respect to the lower subframe 32. The configuration of the translational sliding mechanism 34 will be readily understood by one of skill in the art. The translational sliding mechanism 34 remains locked until released by the crash management system, allowing the upper subframe 28 to slide forward, carrying the wheel 20 and the hub 26 therewith. The translation is initiated by inertial forces, airbag forces, and/or augmented by a pyrotechnic device 70. FIG. 2 illustrates the steering wheel 20' in a position to accommodate a driver of shorter stature as is the vehicle seat 14', and the petal system 16'. The steering wheel 20, illustrated in phantom, is in a position to accommodate a driver of larger stature as is the vehicle seat 14, and the pedal system 16.

The lower subframe 32 is attached to the vehicle body structure 36 through a translational sliding mechanism 38 oriented at an angle determined by packaging requirements to serve the fixed eye point seating concept. As shown best in FIG. 4, the lower subframe 32 is telescopically received in a cavity 56 formed in the vehicle body structure. The cavity 56 is preferably configured in the shape of the steering wheel system 10. This sliding mechanism 38 remains locked until released by an actuator to position the steering wheel 20 according to the size of the driver. As shown in FIG. 2, the lower subframe 32 can be moved upward and forward along the axis 52, and also downward and rearwards in order to position the steering wheel 20 in the hands of a smaller driver at a comfortable and safe distance from his or her torso.

Figure 3:
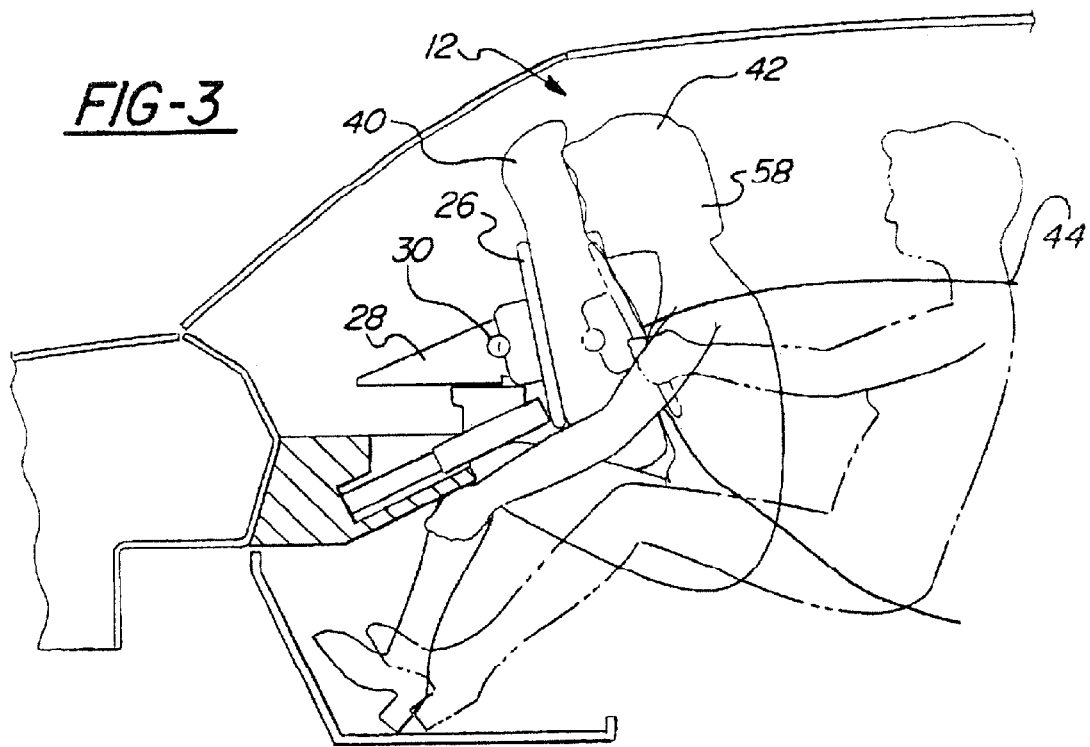
FIG. 3 is a schematic illustration of the driver compartment of a vehicle illustrating the movement of a portion of the steering wheel system along a horizontal axis in the event of a frontal collision in accordance with a preferred embodiment of the present invention.

Referring now to FIG. 3, which illustrates the operation of the steering wheel system 10 in the event of a crash. As shown, in the event of a crash, such as a front-end crash, the upper subframe 28 translates toward the front of the vehicle. In the preferred embodiment, an airbag 40 inflates to restrain the occupant in conjunction with a belt system and to prevent further impact with the vehicle interior in extreme crashes. Additionally, the lower subframe 32 can be released to slide forward and further increase the deceleration space, and absorb energy.

The revolute joint 30 is preferably in close proximity to the wheel hub 26 to allow the steering wheel 20 to assume a more favorable orientation facing the occupant in the event of impact by a driver 58, as shown in FIG. 3, by rotation about an axis 60 when the vehicle is subjected to a predetermined force. In this configuration, the steering wheel 20 moves from a tilted position to a more vertical position, as shown in phantom in FIG. 3. The additional space created by the horizontal travel of the steering wheel 20 and the steering wheel hub 26 in a frontal crash allows greater deceleration distance for the occupant 42, while retarded with the belt system 44 and the airbag 40.

Having now fully described the invention, it will be apparent to one of ordinary skill in the art that many changes and modifications can be made thereto without departing from the spirit or scope of the invention as set forth herein.

What is claimed is:

1. A steering wheel system for a steer-by-wire vehicle, comprising:

a lower subframe that is secured to the vehicle body through a translational sliding mechanism to allow said lower subframe to move with respect to the vehicle body;
   an upper subframe that is secured to said lower subframe;
   a steering wheel attached to said upper subframe;
   a translational sliding mechanism disposed between said upper subframe and said lower subframe to allow said upper subframe to move in a horizontal direction with respect to a ground surface upon application of a predetermined amount of force.

2. The system of claim 1, further comprising:
   a revolute joint connecting said upper subframe to said steering wheel to allow a driver to adjust an angle of said steering wheel.

3. The system of claim 1, wherein movement of said upper subframe with respect to said lower subframe is initiated by inertial forces.

4. The system of claim 1, wherein movement of said upper subframe with respect to said lower subframe is initiated by airbag forces.

5. The system of claim 1, wherein said steering wheel is automatically positioned based on a sensed physical feature of a driver.

6. A steering wheel system for a vehicle, comprising:
   a steering wheel for controlling a plurality of vehicle wheels;
   a computer in communication with said steering wheel and said vehicle wheels to effectuate steering of said vehicle wheels;
   an upper subframe secured to said steering wheel;
   a lower subframe secured to said upper subframe such that said upper subframe overlies said lower subframe in a normal locked position;
   said upper subframe being moveable with respect to said lower subframe in a direction parallel to ground in the event of a front-end vehicle collision.

7. The system of claim 6, wherein said upper subframe and said lower subframe are jointly moveable with respect to a vehicle body structure in order to locate said steering wheel in an optimum position for a driver.

8. The system of claim 7, wherein said steering wheel is located in said optimum position based on a sensed physical feature of said driver.

9. The system of claim 8, wherein said sensed physical feature is a driver's eyes.

10. The system of claim 7, wherein said lower subframe is attached to said vehicle body structure by a translational sliding mechanism.

11. The system of claim 7, wherein said upper subframe is attached to said lower subframe by a translational sliding mechanism.

12. The system of claim 6, wherein said movement of said upper subframe with respect to said lower subframe is initiated by inertial forces.

13. The system of claim 6, wherein said movement of said upper subframe with respect to said lower subframe is initiated by airbag forces.

14. The system of claim 7, wherein said steering wheel is connected to said upper subframe by a revolute joint.

15. An adjustable steering wheel system for a vehicle, comprising:
   an adjustable steering wheel;
   said steering wheel being attached to a subframe, said subframe being moveable along an axis that is diagonal with respect to ground to adjust said steering wheel;
   a sliding mechanism connecting a first portion of said subframe to a second portion of said subframe and allowing relative movement therebetween upon application of a predetermined amount of force; and
   a revolute joint connecting said steering wheel to said subframe and allowing rotation of said steering wheel about an axis upon application of said predetermined amount of force.

16. The system of claim 15, wherein the steering wheel system is incorporated into a steer-by-wire steering system.

17. The system of claim 15, wherein said subframe is attached to the vehicle by a translational sliding mechanism.

* * * * *